United States Patent
Jasiunas et al.

(10) Patent No.: US 9,815,974 B2
(45) Date of Patent: *Nov. 14, 2017

(54) RECYCLED MICRONIZED RUBBER FORMULATION HAVING IMPROVED ABRASION RESISTANCE

(71) Applicant: LEHIGH TECHNOLOGIES, INC., Tucker, GA (US)

(72) Inventors: Chad Aaron Jasiunas, Akron, OH (US); Frank P. Papp, Fort Mill, SC (US); Charles T. Rosenmayer, Decatur, GA (US); Kedar D. Murthy, Boston, MA (US)

(73) Assignee: Lehigh Technologies, Inc., Tucker, GA (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/000,120

(22) Filed: Jan. 19, 2016

(65) Prior Publication Data

US 2016/0208082 A1 Jul. 21, 2016

Related U.S. Application Data

(60) Provisional application No. 62/105,076, filed on Jan. 19, 2015.

(51) Int. Cl.
| | |
|---|---|
| *C08G 63/00* | (2006.01) |
| *C08L 9/06* | (2006.01) |
| *B60C 1/00* | (2006.01) |
| *B29B 17/02* | (2006.01) |
| *B29B 17/04* | (2006.01) |
| *C08J 11/04* | (2006.01) |
| *C08J 11/06* | (2006.01) |
| *C08L 21/00* | (2006.01) |
| *B60C 9/02* | (2006.01) |
| *B60C 13/00* | (2006.01) |
| *B60C 15/00* | (2006.01) |
| *B65G 15/32* | (2006.01) |
| *C08L 7/00* | (2006.01) |
| *C08G 63/02* | (2006.01) |
| *B29K 9/06* | (2006.01) |

(52) U.S. Cl.
CPC .............. *C08L 9/06* (2013.01); *B29B 17/02* (2013.01); *B29B 17/0404* (2013.01); *B60C 1/0016* (2013.01); *B60C 9/02* (2013.01); *B60C 13/00* (2013.01); *B60C 15/00* (2013.01); *B65G 15/32* (2013.01); *C08J 11/04* (2013.01); *C08J 11/06* (2013.01); *C08L 7/00* (2013.01); *C08L 21/00* (2013.01); *B29K 2009/06* (2013.01); *C08J 2321/00* (2013.01); *C08J 2419/00* (2013.01); *Y02P 20/143* (2015.11); *Y02W 30/625* (2015.05); *Y02W 30/70* (2015.05); *Y02W 30/701* (2015.05)

(58) Field of Classification Search
CPC ................................ C08L 6/00; B60C 1/0016
USPC .................. 152/548; 523/156; 524/262, 526
See application file for complete search history.

(56) References Cited

U.S. PATENT DOCUMENTS

| | | | |
|---|---|---|---|
| 4,104,205 A | 8/1978 | Novotny et al. | 526/339 |
| 5,284,625 A | 2/1994 | Isayev et al. | 422/128 |
| 5,602,186 A | 2/1997 | Myers et al. | 521/41 |
| 5,770,632 A | 6/1998 | Sekhar et al. | 521/41.5 |
| 6,541,526 B1 | 4/2003 | Goldshtein et al. | 521/41 |
| 6,548,560 B1 | 4/2003 | Kovalak | 521/41 |
| 6,831,109 B1 | 12/2004 | Beirakh et al. | 521/41 |
| 2010/0317752 A1 | 12/2010 | Sekhar et al. | 521/40 |
| 2015/0315363 A1* | 11/2015 | Jasiunas | C08K 5/43 523/156 |
| 2016/0152805 A1* | 6/2016 | Jasiunas | B60C 15/00 152/548 |

* cited by examiner

Primary Examiner — Terressa Boykin
(74) Attorney, Agent, or Firm — Alvin T. Rockhill

(57) ABSTRACT

This invention is based upon the discovery that micronized solution styrene-butadiene rubber from postconsumer sources can be included in rubber formulations without severely compromising abrasion resistance. The micronized solution styrene-butadiene rubber utilized in the rubber formulations of this invention can be made by cryogenic grinding postconsumer rubber products using conventional procedures. For instance, it can be made by cryogenically grinding a tire tread containing a high level of solution styrene-butadiene rubber. The micronized solution styrene-butadiene rubber can then be blending into desired virgin rubbers and cured without significantly compromising the abrasion resistance of the rubber formulation. The rubber formulation of this invention is comprised of a natural or synthetic rubber and from 1 weight percent to 30 weight percent of a micronized rubber composition containing at least 10 weight percent solution styrene-butadiene rubber and having a particle size of 40 mesh to 200 mesh.

20 Claims, 1 Drawing Sheet

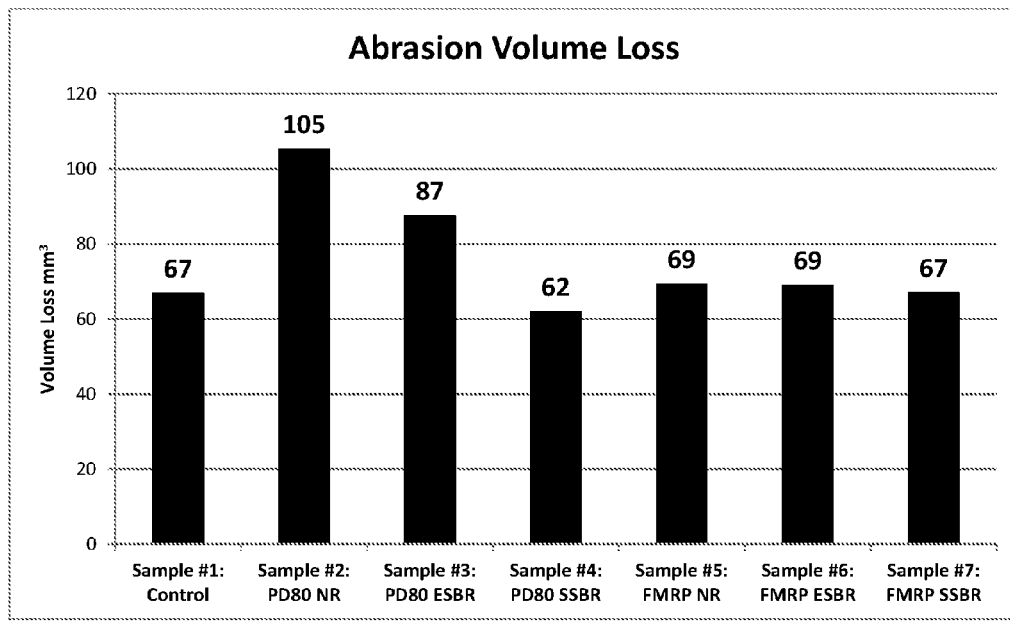

RECYCLED MICRONIZED RUBBER FORMULATION HAVING IMPROVED ABRASION RESISTANCE

The benefit of U.S. Provisional Patent Application Ser. No. 62/105,076 filed on Jan. 19, 2015 is claimed hereby. The teachings of U.S. Provisional Patent Application Ser. No. 62/105,076 are incorporated herein by reference in their entirety.

FIELD OF THE INVENTION

The present invention relates generally to a reclaimed rubber composition which can be blended into virgin rubbers and used in making a variety of rubber products which exhibit improved abrasion resistance as compared to rubber compositions made using conventional reclaimed rubber which has been micronized.

BACKGROUND OF THE INVENTION

Millions of used tires, hoses, belts and other rubber products are discarded annually after they have been worn-out during their useful service life. These used rubber products are typically hauled to a dump or simply burnt as fuel after they have served their original intended purpose. A limited number of used tires are utilized in building retaining walls, as guards for protecting boats, and in similar applications. Some tires are ground into powder form to be used in various applications, such as tire compounds, binders for asphalt, mulch, fillers for a variety of low performance rubber products, sports field applications, and the like. However, a far greater number of tires, hoses and belts are simply discarded or burnt.

The recycling of cured rubber products has proven to be extremely challenging and problematic. Recycling cured rubber products (such as, tires, hoses and belts) is problematic because, in the vulcanization process, the rubber becomes crosslinked with sulfur. The sulfur crosslinks are very stable and the vulcanization process is extremely difficult to reverse. After vulcanization, the crosslinked rubber becomes thermoset and cannot easily be reformed into other products. In other words, the cured rubber cannot be melted and reformed into other products like metals or thermoplastic materials. Thus, cured rubber products cannot be simply melted and easily recycled into new products.

Since the discovery of the rubber vulcanization process by Charles Goodyear in the nineteenth century, there has been interest in the recycling of cured rubber. A certain amount of cured rubber from tires and other rubber products is shredded or ground to a small particle size and incorporated into various products as a type of filler. For instance, ground rubber can be incorporated into asphalt for surfacing roads or parking lots. Small particles of cured rubber can also be included in rubber formulations for new tires and other rubber products. However, it should be understood that the recycled rubber serves only in the capacity of a filler because it was previously cured and does not bond to an appreciable extent to the virgin rubber in the rubber formulation. Therefore, recycled rubber is typically limited to lower loadings due to poor compound processing (compounds become drier with higher loadings) as well as higher loadings leading to unacceptable cure properties.

Various techniques for devulcanizing cured rubber have been developed. Devulcanization offers the advantage of rendering the rubber suitable for being reformulated and recured into new rubber articles if it can be carried out without degradation of the rubber. In other words, the rubber could again be used for its original intended purpose. However, none of the devulcanization techniques previously developed have proven to be commercially viable at high loadings. For example, some devulcanized materials may be used at loadings of 3-5%. However, above this level the properties of the new rubber article are diminished. This renders them unsuitable for high performance applications, such as vehicle tires, power transmission belts, conveyor belts, hoses, windshield wiper blades, and the like. In other cases, the devulcanized materials are unsuitable for processing at high loadings into rubber compounds. These processing challenges can include short cure times (scorch), too little tack, too high of a viscosity, and poor mill handling and extrusion quality. A renewable material that can be used in high performance applications at loadings of 5% and higher is accordingly needed so that recycled rubber can be used in manufacturing products having higher demands on performance.

U.S. Pat. No. 4,104,205 discloses a technique for devulcanizing sulfur-vulcanized elastomer containing polar groups which comprises applying a controlled dose of microwave energy of between 915 MHz and 2450 MHz and between 41 and 177 watt-hours per pound in an amount sufficient to sever substantially all carbon-sulfur and sulfur-sulfur bonds and insufficient to sever significant amounts of carbon-carbon bonds.

U.S. Pat. No. 5,284,625 discloses a continuous ultrasonic method for breaking the carbon-sulfur, sulfur-sulfur and, if desired, the carbon-carbon bonds in a vulcanized elastomer. Through the application of certain levels of ultrasonic amplitudes in the presence of pressure and optionally heat, it is reported that cured rubber can be broken down. Using this process, the rubber becomes soft, thereby enabling it to be reprocessed and reshaped in a manner similar to that employed with previously uncured elastomers.

U.S. Pat. No. 5,602,186 discloses a process for devulcanizing cured rubber by desulfurization, comprising the steps of: contacting rubber vulcanizate crumb with a solvent and an alkali metal to form a reaction mixture, heating the reaction mixture in the absence of oxygen and with mixing to a temperature sufficient to cause the alkali metal to react with sulfur in the rubber vulcanizate and maintaining the temperature below that at which thermal cracking of the rubber occurs, thereby devulcanizing the rubber vulcanizate. U.S. Pat. No. 5,602,186 indicates that it is preferred to control the temperature below about 300° C., or where thermal cracking of the rubber is initiated. Toluene, naphtha, terpenes, benzene, cyclohexane, diethyl carbonate, ethyl acetate, ethylbenzene, isophorone, isopropyl acetate, methyl ethyl ketone and derivatives thereof are identified as solvents that can be used in the process disclosed by this patent.

U.S. Pat. No. 6,548,560 is based upon the discovery that cured rubber can be devulcanized by heating it to a temperature of at least about 150° C. under a pressure of at least about $3.4 \times 10^6$ Pascals in the presence of a solvent selected from the group consisting of alcohols and ketones having a critical temperature within the range of about 200° C. to about 350° C. The molecular weight of the rubber can be maintained at a relatively high level if the devulcanization is carried out at a temperature of no more than about 300° C. This devulcanization technique is reported to not significantly break the polymeric backbone of the rubber or to change its microstructure. In other words, the devulcanized rubber can be recompounded and recured into useful articles in substantially the same way as was the original (virgin) rubber. This patent more specifically reveals a process for devulcanizing cured rubber into devulcanized rubber that is capable of being recompounded and recured into useful rubber products, said process comprising (1) heating the cured rubber to a temperature which is within the range of about 150° C. to about 300° C. under a pressure of at least about $3.4 \times 10^6$ Pascals in the presence of a solvent selected from the group consisting of alcohols and ketones, wherein said solvent has a critical temperature which is within the range of about 200° C. to about 350° C., to devulcanize the cured rubber into the devulcanized rubber thereby producing a slurry of the devulcanized rubber in the solvent; and (2) separating the devulcanized rubber from the solve.

U.S. Pat. No. 5,770,632 discloses a process for reclaiming elastomeric material from elemental sulphur-cured elastomeric material having a vulcanized network without using hexamethylene tetramine, by treating the sulphur-cured elastomeric material having a vulcanized network with one or more rubber delinking accelerators selected from the group of zinc salts of thiocarbamates and zinc salts of dialkyl dithiophosphates, 2-mercaptobenzothiazole or derivatives thereof, thiurams, guanidines, 4,4'-dithiomorpholine and sulphenamides, and a zinc oxide activator in an amount sufficient to act as an activator for the accelerator(s) to delink the elastomeric material at a temperature below 70° C., whereby the vulcanized network is opened up or delinked to provide a curable reclaimed elastomeric material capable of being vulcanized without adding rubber vulcanizing chemicals. The technique described in this patent also includes compositions capable of delinking the vulcanized network of sulphur-cured elastomeric materials including the accelerators and activator described above. The obtained recycled, or reclaimed, elastomeric material has desired physical and dynamic characteristics that render it suitable for use in molded goods or for admixture with fresh compounds in tires and related products.

U.S. Pat. No. 6,831,109 described a modifier for devulcanization of cured elastomers, and especially vulcanized rubber, said modifier containing a first chemical substance, which is disposed towards on and the formation of an organic cation and amine, and further containing a second chemical substance as promoter of dissociation of the first chemical substance, said promoter containing a functional group constituting an acceptor of said amine.

U.S. Pat. No. 6,541,526 describes a mechanical/chemical method composition for the de-vulcanization of rubber is reported to maintain the macromolecules in the composition and to render the sulfur therein passive for later re-vulcanization. This process is also reported to be cost effective, environmentally friendly and to produce high quality devulcanized rubber to replace virgin rubber. According to the method of U.S. Pat. No. 6,541,526 waste rubber is shredded, crushed and metal is removed. Then the modifying composition is added as the particles of shredded waste rubber are poured between two rollers that further crush the particles. The modifying composition is a mixture of ingredients which include, by weight, the following components: (1) between approximately 76% and approximately 94% of a proton donor that breaks sulfur to sulfur bonds in the waste rubber; (2) between approximately 1% and approximately 5% of a metal oxide, (3) between approximately 1% and approximately 5% of an organic acid having between 16 and 24 carbon atoms per molecule, (4) between approximately 2% and approximately 10% of a vulcanization inhibitor and (5) between approximately 2% and approximately 10% of a friction agent.

United States Patent Application Publication No. 2010/0317752 described a method which is reported to be effective in recycling vulcanized elastomeric materials via a cost effective devulcanization process which opens up or "delinks" the crosslinks of the vulcanized network structure in used vulcanized elastomers without unduly degrading the backbone of the rubbery polymer. This patent more specifically discloses a delinking composition in the form of a combined solid dose comprising: (i) one or more elastomer delinking accelerators selected from the group consisting of zinc salts of thiocarbamates and zinc salts of dialkyl dithiophosphates; and (ii) one or more elastomer delinking accelerators selected from the group consisting of 2-mercaptobenzothiazole or derivatives thereof, thiurams, guanidines, 4,4'-dithiomorpholine and sulpenamides; and (iii) at least one elastomer delinking activator. However, this patent absolutely requires as essential ingredients zinc salt, an elastomer delinking accelerator and a delinking activator.

Accordingly, these foregoing patents have not proven to be commercially viable and the recycled rubber made by these processes have not proven to be feasible for use at high loadings in value added applications, such as high performance tires. To date very little characterization data has been presented to substantiate the statements regarding the selectivity of sulfur-sulfur or sulfur-carbon bonds being broken instead carbon-carbon bonds within the vulcanized rubber compound network.

Cured rubber articles can also be ground into a powder and used in manufacturing a wide variety of products. Reclaimed elastomeric materials, such as reclaimed elastomers, ground tire rubber (GTR), and micronized rubber powders (MRP), which include vulcanized elastomeric materials, are used in a variety of products. For instance, micronized rubber powders are commonly used as fillers in rubber, asphalt, and plastic articles. More specifically, micronized rubber powders are presently being utilized as fillers in tires, industrial rubber products (hoses, power transmission belts, conveyor belts, floor mats), asphalt products (paving formulations and roofing shingles) and a wide array of other products. The utilization of reclaimed elastomers in such rubber products is typically significantly less expensive than using virgin materials and leads to an overall reduction in manufacturing costs. The use of reclaimed material is also environmentally advantageous in that it prevents the cured rubber recovered from postconsumer and industrial sources from going to landfills or simply being burned. Finally, the use of recycled ground tire rubber and micronized rubber powders provides a strategic supply chain hedge against petroleum-based supply chain price and supply volatility.

Today devulcanized rubber material known as reclaim exhibits excellent processability but poor cure properties in compounds at loadings above 3-5%. Micronized rubber powder (MRP) shows acceptable cure properties, yet at higher loadings (above 5%), compound processability begins to suffer.

Generally, ground tire rubber (GTR) consists of particle size distributions that range from a diameter of about 0.5 mm to about 5 mm which can be produced by a variety of techniques including ambient temperature and cryogenic grinding methods. Micronized rubber powders (MRP) typically contain a significant fraction of rubber particles having a particle size of less than 100 microns. In any case, ground tire rubber and micronized rubber powders are commonly designated by mesh size. For example, powders in the size range of 10-30 mesh normally are considered to be ground tire rubber while powders having a smaller particle size which is within the range of 40-300 mesh are generally considered to be micronized rubber powder. Micronized rubber powder is typically more expensive to make by virtue of requiring more processing and/or more demanding processing conditions to attain the smaller particle size. For this reason, ground tire rubber is typically used in low performance applications, such as floor mats, with micronized rubber powder only being utilized in more demanding applications, such as tires, where the additional cost can be justified.

The reclaimed elastomeric polymers which are used as the raw material for making ground tire rubber and micronized rubber powder, such as scrap tire rubber, are cured (previously vulcanized) rubbers. They are accordingly relatively inert particles which are essentially non-reactive with virgin elastomers, which results in compromised processing and properties at high loadings. The use of such reclaimed rubbers in manufacturing new rubber products often leads to a compromised level abrasion resistance which greatly limits the level at which they can be incorporated into products which are subjected to abrasive forces during their service life, such as tire tread formulations, windshield wiper blades, and conveyor belts, and the like.

There is a long-felt but unresolved need for renewed elastomer compositions which are derived from reclaimed rubber which retain uncured and cured chemical and mechanical characteristics, including abrasion resistance, which are virtually the same as virgin rubber. In other words, it would be highly desirable for such an elastomer to be capable of being processed in essentially the same way as virgin rubber and to be capable of being substituted in total or at least in part for virgin rubber in manufacturing useful products which are subjected to abrasive forces.

SUMMARY OF THE INVENTION

The present invention is based upon the discovery that micronized solution styrene-butadiene rubber from postconsumer sources can be included in rubber formulations without severely compromising the abrasion resistance thereof. The micronized solution styrene-butadiene rubber utilized in the rubber formulations of this invention can be made by using conventional cryogenic grinding procedures. For instance, it can be made by cryogenically grinding a tire tread containing a high level of solution styrene-butadiene rubber. The micronized solution styrene-butadiene rubber can then be blending into desired virgin rubbers and cured without significantly compromising the abrasion resistance of the rubber formulation.

Prior to this invention only limited amounts of conventional recycled rubber could be added to rubber products which were subject to abrasive forces because the tendency of the product to abrade increased in direct proportion to the amount of conventional recycled micronized rubber included in the formulation. This in turn greatly limited the level of conventional micronized rubber that could be included in the formulation because increased rates of abrasion caused the product, such as a tire tread, hose, or windshield wiper blade, to abrade and wear out more rapidly than was acceptable.

Unlike other rubber formulations containing recycled micronized rubber, the rubber formulation of this invention does not cause appreciable deterioration in the abrasion characteristics of products made therewith. The renewed rubber of this invention can be used as the rubber constituent or a part of the rubber formulation employed in manufacturing rubber products, such as tires, hoses, power transmission belts, conveyor belts, and numerous other rubber articles.

The subject invention more specifically discloses a rubber formulation which is particularly useful in rubber products or components of rubber products which are subject to abrasive forces, said rubber formulation comprising: at least one natural or synthetic rubber and from 1 weight percent to 30 weight percent of a micronized rubber composition having a particle size which is less than 40 mesh (typically within the range of 40 mesh to 200 mesh), wherein the micronized rubber composition is comprised of at least 10 weight percent solution styrene-butadiene rubber.

The present invention also reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of a rubber formulation which includes at least one natural or synthetic rubber and from 1 weight percent to 30 weight percent of a micronized rubber composition having a particle size which is within the range of 40 mesh to 200 mesh, wherein the micronized rubber composition is comprised of at least 10 weight percent solution styrene-butadiene rubber.

The subject invention further discloses a conveyor belt which is comprised of a carry cover layer, a reinforcement layer which is situated under the carry cover layer, and a pulley cover layer which is situated under the carry cover layer, wherein the carry cover layer is comprised of a rubber formulation which includes at least one natural or synthetic rubber and from 1 weight percent to 30 weight percent of a micronized rubber composition having a particle size which is within the range of 40 mesh to 200 mesh, wherein the micronized rubber composition is comprised of at least 10 weight percent solution styrene-butadiene rubber.

BRIEF DESCRIPTION OF THE DRAWINGS

FIG. 1 shows the abrasion loss of rubber formulation of this invention as compared to control formulations. This FIGURE shows that the rubber formulations of this invention provide excellent abrasion characteristics.

DETAILED DESCRIPTION OF THE INVENTION

The rubber formulation of this invention includes at least one natural or synthetic rubber and micronized solution styrene-butadiene rubber (SSBR). The solution styrene-butadiene rubber utilized in accordance with this invention is synthesized by solution polymerization. In other words, the solution styrene-butadiene rubber is made by the copolymerization of 1,3-butadiene monomer and styrene monomer in a suitable organic solvent. The solution styrene-butadiene rubber utilized in the practice of this invention will typically contain from 20 weight percent to 30 weight percent bound styrene and from 70 weight percent to 80 weight percent bound butadiene. The solution styrene-butadiene rubber utilized in the practice of this invention will more typically contain from 22 weight percent to 25 weight percent bound styrene and from 75 weight percent to 78 weight percent bound butadiene. Such solution polymerizations can be initiated with an alkyl lithium compound, such as isobutyl lithium, with the monomers and resultant styrene-butadiene rubber being in a solution. Accordingly, the rubber is referred to as "solution styrene-butadiene rubber" because it is made via solution polymerization. This can be contrasted to emulsion styrene-butadiene rubber is in synthesized by emulsion polymerization.

The natural or synthetic rubber into which the micronized styrene-butadiene rubber is blended can be virtually any desired kind of sulfur curable rubber. For instance, the rubber be natural rubber, synthetic polyisoprene rubber, high cis-1,4-polybutadiene rubber, medium vinyl polybutadiene rubber, high vinyl polybutadiene rubber, emulsion styrene-butadiene rubber, solution styrene-butadiene rubber, styrene-isoprene-butadiene rubber, styrene-isoprene rubber, butyl rubber, chlorobutyl rubber, bromobutyl rubber, polynorbornene rubber, ethylene-propylene rubber (EPR), ethylene-propylene-diene rubber (EPDM), nitrile rubber, carboxylated nitrile rubber, polychloroprene rubber (neoprene rubber), polysulfide rubbers, polyacrylic rubbers, silicon rubbers, chlorosulfonated polyethylene rubbers, and the like as well as various mixtures thereof.

The micronized solution styrene-butadiene rubber employed in the formulations of this invention can be micronized utilizing virtually any technique which results in the SSBR having a small particle size which is typically between 40 mesh to 200 mesh. The micronized solution styrene-butadiene rubber utilized in the rubber formulations of this invention will more typically have a particle size of 60 mesh to 160 mesh. In some applications it may be advantageous to employ a micronized rubber powder having a particle size of 80 mesh to 120 mesh.

The micronized solution styrene-butadiene rubber used in the rubber formulations of this invention can come from a wide variety of sources having a high content of solution styrene-butadiene rubber. For instance, it can be recovered from tire treads which include a high level of solution styrene-butadiene rubber. For example, the solution styrene-butadiene rubber can be recovered from vehicle tire treads in recapping procedures. More specifically, "rubber buffings" from tire treads containing high levels of solution styrene-butadiene rubber can be used in the practice of this invention. Such rubber buffings are comprised of rubber which has been buffed off of vehicle tire tread when preparing the old tire carcass for recapping. In the recapping procedure a new tread is applied to the old tire carcass and cured onto it to make the retreaded tire. In any case, such vehicle tire retread buffings which contain a high level are solution styrene-butadiene rubber and various other rubbers including natural rubber and various synthetic rubbers, such as synthetic polyisoprene rubber, polybutadiene rubber, and emulsion styrene-butadiene rubber, can be used.

Accordingly, the micronized rubber powder utilized in accordance with this invention can be a blend of solution styrene-butadiene rubber with natural rubber, synthetic polyisoprene rubber, polybutadiene rubber, and emulsion styrene-butadiene rubber and a wide variety of other rubbers. In any case, the micronized solution styrene-butadiene rubber can consist solely of solution styrene-butadiene rubber or it can be a blend of the solution styrene-butadiene rubber with natural rubber, synthetic polyisoprene rubber, emulsion styrene-butadiene rubber, polybutadiene rubber and various mixtures thereof.

In one specific embodiment of this invention the micronized solution styrene-butadiene rubber can be made utilizing the cryogenic grinding system described in U.S. Pat. No. 7,445,170 and an impact mill as described in U.S. Pat. No. 7,861,958. The teachings of U.S. Pat. No. 7,445,170 and U.S. Pat. No. 7,861,958 are incorporated herein for purposes of describing useful techniques and equipment which can be employed in making micronized solution styrene-butadiene rubber powder that can be employed in making renewed rubber compositions in accordance with this invention. Micronized rubber powder can also be made in many other ways other than described above, such as but not limited to a wet grinding process, ambient temperature grinding procedures, and other cryogenic processes. In any case the micronized solution styrene-butadiene rubber will contain at least 10 weight percent of the solution styrene-butadiene rubber polymer and from 10 weight percent to 90 weight percent additional rubbery polymers. The micronized solution styrene-butadiene rubber can contain at least 20 weight percent, at least 30 weight percent, at least 40 weight percent, at least 50 weight percent, at least 60 weight percent, or at least 70 weight percent solution styrene-butadiene rubber polymer with the balance of the polymer content of the micronized formulation being other rubbery polymers.

The rubber formulation of this invention will include between 1 weight percent and 30 weight percent of the micronized rubber composition (including the solution styrene butadiene rubber) with the balance of the polymers being used in the formulation being desired virgin rubbers, such as natural rubber, polybutadiene rubber (high cis-1,4-polybutadiene rubber, medium vinyl polybutadiene rubber, low vinyl polybutadiene rubber), emulsion styrene-butadiene rubber, solution styrene-butadiene rubber, and the like. The rubber formulation of this invention will more frequently contain from 2 weight percent to 20 weight percent of the micronized rubber composition, and may contain from 3 weight percent to 15 weight percent of micronized rubber composition. For instance, the rubber formulation of this invention can contain from 4 weight percent to 10 weight percent of the micronized rubber composition with the balance of the rubber formulation being virgin rubbers.

One rubber formulation of this invention which exhibits a particularly desirable combination of properties including excellent abrasion loss is comprised of 55 phr to 75 phr of virgin solution styrene-butadiene rubber, 5 phr to 25 phr of virgin high cis1,4-polybutadiene rubber, 5 phr to 25 phr of micronized rubber powder, 30 phr to 50 phr of reinforcing silica, and 3 phr to 12 phr of carbon black. Such a rubber formulation will preferably contain 60 phr to 70 phr of virgin solution styrene-butadiene rubber, 12 phr to 22 phr of virgin high cis1,4-polybutadiene rubber, 12 phr to 22 phr of micronized rubber powder, 35 phr to 45 phr of reinforcing silica, and 4 phr to 8 phr of carbon black.

In one embodiment of this invention the micronized solution styrene-butadiene rubber is functionalized to attain an environmentally friendly, chemically functionalized, renewed rubber composition having a highly desirable combination of physical properties and which exhibits excellent processability. This functionalization is carried out (1) blending a micronized solution styrene-butadiene rubber powder with a processing aid and a functionalizing agent to produce a blended mixture; (2) processing the blended mixture under conditions of high shear and low temperature to produce a reacted mixture; (3) adding a stabilizer to the reacted mixture to produce the renewed rubber. The method for functionalization of the solution styrene-butadiene rubber is described in greater detail in U.S. Provisional Patent Application Ser. No. 61/986,696, filed on Apr. 30, 2014. The teachings of U.S. Provisional Patent Application Ser. No. 61/986,696 are incorporated by references herein for the purpose of disclosing a manner by which the solution styrene-butadiene rubber can be functionalized.

EXAMPLE 1

Three model tread compounds were formulated to make a base material for comparison as micronized rubber powder to be used in a low rolling resistance model tread compound. Table 1 depicts a model tread compound for low rolling resistance applications using solution styrene butadiene rubber (SSBR) and polybutadiene (PBR). Table 2 illustrates a model natural rubber (NR) compound suitable for off the road applications, while Table 3 shows an economic tread compound using emulsion styrene butadiene rubber (ESBR) for replacement tire applications.

TABLE 1

Model Low Rolling Resistance Tread Compound Recipe

| Standard SSBR/BR/Silica/Silane Compound | | Control | Control + 10% MRP | Control + 10% FMRP |
|---|---|---|---|---|
| Units | Description | PHR | PHR | PHR |
| SSBR | solution styrene-butadiene rubber (Tg = −30° C.) | 103.13 | 103.13 | 103.13 |
| High Cis PBR | high cis1,4-polybutadiene rubber | 25.00 | 25.00 | 25.00 |
| MRP | micronized rubber powder | | 25.57 | |
| FMRP | functional compound | | | 25.57 |
| Corsol 200 | process oil | 5.00 | 5.00 | 5.00 |
| Aktiplast PP | process aid - zinc salts of higher molecular fatty acids | 2.00 | 2.00 | 2.00 |
| N234 | tread carbon black | 10.00 | 10.00 | 10.00 |
| Zeosil 1165MP | silica | 65.00 | 65.00 | 65.00 |
| 6PPD Antidegradant | N-(1,3-Dimethylbutyl)-N'-phenyl-p-phenylenediamine | 2.00 | 2.00 | 2.00 |
| Antioxidant DQ (TMQ) | polymerized 2,2,4-trimethyl-1,2-dihydroquinoline | 0.50 | 0.50 | 0.50 |
| Akrowax 5084 (Wax Blend) | blend of microcrystalline wax and a range of different melt-point paraffin waxes | 2.00 | 2.00 | 2.00 |
| Si 266 Silane | bis(triethoxysilylpropyl) disulfide | 5.20 | 5.20 | 5.20 |
| Zinc Oxide Dispersion (85% ZnO) | cure activator | 2.94 | 2.94 | 2.94 |
| Stearic Acid | activator | 1.50 | 1.50 | 1.50 |
| CBS | N-cyclohexyl-2-benzothioazole sulfenamide | 1.50 | 1.50 | 1.50 |
| DPG | diphenyl guanidine | 1.70 | 1.70 | 1.70 |
| Sulfur Dispersion (80% Sulfur) | cure agent | 2.13 | 2.66 | 2.66 |
| Total PHR Finish Batch | | 229.60 | 255.70 | 255.70 |

TABLE 2

Model Natural Rubber Tread Compound Recipe

| Natural Rubber Tread Compound | | Control |
|---|---|---|
| Units | Description | PHR |
| Natural Rubber Clarimer L | natural rubber | 100.00 |
| PD80 | micronized rubber powder | |
| FMRP | functional compound | |
| Corsol C200 | process oil | 5.00 |
| N234 | tread carbon black | 50.00 |
| 6PPD Antidegradant (PD-2) | N-(1,3-Dimethylbutyl)-N'-phenyl-p-phenylenediamine | 2.00 |
| TMQ Antidegradant | polymerized 2,2,4-trimethyl-1,2-dihydroquinoline | 1.50 |
| Microcrystalline and Paraffin Wax Blend | blend of microcrystalline wax and a range of different melt-point paraffin waxes | 1.50 |
| Zinc Oxide Dispersion (85% ZnO) | cure activator | 3.53 |
| Stearic Acid | activator | 1.50 |
| TBBS Accelerator | N-tert-butyl-2 benzothiazolesulfenamide | 1.50 |
| Sulfur Dispersion (80% Sulfur) | cure agent | 1.63 |
| Total PHR Finish Batch | | 168.15 |

TABLE 3

Model ESBR Tread Compound Recipe

| Emulsion SBR Tread Compound | | ESBR Tread |
|---|---|---|
| Units | Description | PHR |
| ESBR1500 (Non-oil extended) | Emulsion SBR (23.5% bound styrene, 52 Mooney viscosity and cold polymerized) | 52.00 |
| ESBR1763 (HV NAP Oil Extended 27.27%) | Emulsion SBR (23.5% bound styrene, 27.27% heavy naphthenic oil, 42 Mooney viscosity, and cold polymerized) | 66.01 |

TABLE 3-continued

Model ESBR Tread Compound Recipe

| Emulsion SBR Tread Compound | | ESBR Tread |
|---|---|---|
| Units | Description | PHR |
| PD80 | micronized rubber powder | |
| FMRP | functional compound | |
| Nytex 4700 Process Oil | process oil | 6.00 |
| Struktol 40MS | homogenizing agent - mixture of dark aromatic hydrocarbon resins | 1.00 |
| Alkyl Phenol Formaldehyde Novalak Tack Resin | phenolyic resin | 3.00 |
| N234 | tread carbon black | 75.00 |
| 6PPD Antidegradant (PD-2) | N-(1,3-Dimethylbutyl)-N'-phenyl-p-phenylenediamine | 2.00 |
| TMQ Antidegradant | polymerized 2,2,4-trimethyl-1,2-dihydroquinoline | 1.00 |
| Microcrystalline and Paraffin Wax Blend | blend of microcrystalline wax and a range of different melt-point paraffin waxes | 1.50 |
| Zinc Oxide Dispersion (85% ZnO) | cure activator | 3.53 |
| Stearic Acid | activator | 2.00 |
| TBBS Accelerator | N-tert-butyl-2 benzothiazolesulfenamide | 1.20 |
| DPG Accelerator | diphenyl guanidine | 0.20 |
| Sulfur Dispersion (80% Sulfur) | cure agent | 2.00 |
| Total PHR Finish Batch | | 216.44 |

Each of the cured rubber plaques for the three model compounds were aged in an oven at 70° C. for four weeks. Once aged, each tread plaque was then cryogenically ground to create an 80 mesh type material for each of the starting materials.

This ground material was then used as an additive for the low rolling model tread compound as outlined in Table 1 for comparison of abrasion characteristics. Each of the starting material micronized rubber powders was also functionalized to determine abrasion characteristics. Results of these trials are shown in FIG. 1.

As can be seen from reviewing FIG. 1, the abrasion loss exhibited in Sample 4 wherein the micronized rubber was solution SBR was excellent with very low abrasion loss. In fact, the abrasion loss exhibited in Sample 4 as actually lower than that determined in the control where micronized rubber was not included in the rubber formulation. The abrasion loss determined in Sample 3 compared even more favorably to the increased levels of abrasion loss which were shown in Samples 2 and 3 which included micronized natural rubber and micronized ESBR, respectively.

Samples 5 through 7 show that functionalization of the micronized rubber did not deteriorate abrasion loss characteristics in general. In fact, the samples which included functionalized micronized rubber powder (FNRP) exhibited lower abrasion loss than their unfunctionalized counterparts.

While certain representative embodiments and details have been shown for the purpose of illustrating the subject invention, it will be apparent to those skilled in this art that various changes and modifications can be made therein without departing from the scope of the subject invention.

What is claimed is:

1. A rubber formulation which is particularly useful in rubber products or components of rubber products which are subject to abrasive forces, said rubber formulation comprising: at least one natural or synthetic rubber and from 1 weight percent to 30 weight percent of a micronized rubber composition having a particle size which is within the range of 40 mesh to 200 mesh, wherein the micronized rubber composition is comprised of at least 10 weight percent solution styrene-butadiene rubber.

2. The rubber formulation of claim 1 wherein the micronized rubber composition is present at a level which is within the range of 2 weight percent to 20 weight percent.

3. The rubber formulation of claim 1 wherein the micronized rubber composition is present at a level which is within the range of 3 weight percent to 15 weight percent.

4. The rubber formulation of claim 1 wherein the micronized rubber composition is present at a level which is within the range of 4 weight percent to 10 weight percent.

5. The rubber formulation of claim 1 wherein the micronized rubber composition has a particle size which is within the range of 60 mesh to 160 mesh.

6. The rubber formulation of claim 1 wherein the micronized rubber composition has a particle size which is within the range of 80 mesh to 120 mesh.

7. The rubber formulation of claim 1 wherein the micronized rubber composition is comprised of at least 20 weight percent of the solution styrene-butadiene rubber.

8. The rubber formulation of claim 1 wherein the micronized rubber composition is comprised of at least 30 weight percent of the solution styrene-butadiene rubber.

9. The rubber formulation of claim 1 wherein the micronized rubber composition is comprised of at least 40 weight percent of the solution styrene-butadiene rubber.

10. The rubber formulation of claim 1 wherein the micronized rubber composition is comprised of at least 50 weight percent of the solution styrene-butadiene rubber.

11. The rubber formulation of claim 1 wherein the micronized rubber composition is comprised of at least 60 weight percent of the solution styrene-butadiene rubber.

12. The rubber formulation of claim 1 wherein the micronized rubber composition is comprised of at least 70 weight percent of the solution styrene-butadiene rubber.

13. The rubber formulation of claim 1 which is comprised of 55 phr to 75 phr of solution styrene-butadiene rubber, 5 phr to 25 phr of high cis1,4-polybutadiene rubber, 5 phr to 25 phr of the micronized rubber composition.

14. The rubber formulation of claim 13 which is further comprised of 30 phr to 50 phr of reinforcing silica.

15. The rubber formulation of claim 14 which is further comprised of 3 phr to 12 phr of carbon black.

16. The rubber formulation of claim 5 which is comprised of 60 phr to 70 phr of solution styrene-butadiene rubber, 12 phr to 22 phr of high cis1,4-polybutadiene rubber, 12 phr to 22 phr of the micronized rubber composition.

17. The rubber formulation of claim 16 which is further comprised of 35 phr to 45 phr of reinforcing silica.

18. The rubber formulation of claim 17 which is further comprised of 4 phr to 8 phr of carbon black.

19. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of the rubber formulation as specified in claim 1.

20. A conveyor belt which is comprised of a carry cover layer, a reinforcement layer which is situated under the carry cover layer, and a pulley cover layer which is situated under the carry cover layer, wherein the carry cover layer is comprised of the rubber formulation as specified in claim 1.

\* \* \* \* \*